Nov. 18, 1952    D. L. KAUFMAN    2,618,134
LIQUID COOLING APPARATUS
Filed Dec. 8, 1949    2 SHEETS—SHEET 1

INVENTOR.
DANIEL L. KAUFMAN.
BY
Spencer, Hardman & Fehr.
HIS ATTORNEYS

Nov. 18, 1952  D. L. KAUFMAN  2,618,134
LIQUID COOLING APPARATUS
Filed Dec. 8, 1949  2 SHEETS—SHEET 2

INVENTOR.
DANIEL L. KAUFMAN.
BY
Spencer, Hardman & Fehr
HIS ATTORNEYS

Patented Nov. 18, 1952

2,618,134

UNITED STATES PATENT OFFICE 2,618,134

LIQUID COOLING APPARATUS

Daniel L. Kaufman, Dayton, Ohio, assignor to General Motors Corporation, Dayton, Ohio, a corporation of Delaware Application December 8, 1949, Serial No. 131,894

9 Claims. (Cl. 62—141)

1

This invention relates to refrigeration and particularly to milk cooling apparatus.

It is well-known that milk in cans placed in a cabinet and sprayed with a cooling liquid will be more rapidly chilled if the milk is stirred or agitated to bring warm milk in the center of the cans into contact with the can side walls. I am aware of the fact that others have provided means for agitating milk in cans during cooling thereof and my invention relates specifically to an improved method and apparatus for more effectively agitating milk in cans at the time the temperature of the milk is being reduced.

An object of my invention is to provide an improved refrigerating apparatus for receiving cans of milk to be cooled and which apparatus is durable, efficient in operation and of low manufacturing cost.

Another object of my invention is to provide an improved and novel means for agitating milk in cans during cooling thereof.

A further object of my invention is to utilize the flow of some of the cooling fluid circulated from the body thereof in a milk cooling cabinet over cans of milk therein to operate a means for causing vibration and/or wobbling of the cans and agitation of milk contained therein.

A still further object of my invention is to utilize flow of some of the cooling liquid circulated in a milk cooler cabinet for driving an unbalanced water wheel secured to a milk can supporting platform or rack whereby operation of the wheel causes movement of the platform or rack and cans containing milk to be cooled located thereon for agitating the milk.

In carrying out the foregoing objects it is a more specific object of my invention to arrange the receptacles or cans of milk to be cooled on a resiliently supported rack or platform immersed in a body of cooling liquid in a cabinet in such manner that when the rack or platform is vibrated or wobbled the cans will tilt back and forth relative to the rack, so as to augment the vibrating movement and more effectively agitate milk in the cans.

Further objects and advantages of the present invention will be apparent from the following description, reference being had to the accompanying drawings, wherein a preferred form of the present invention is clearly shown.

2

Figure 2:
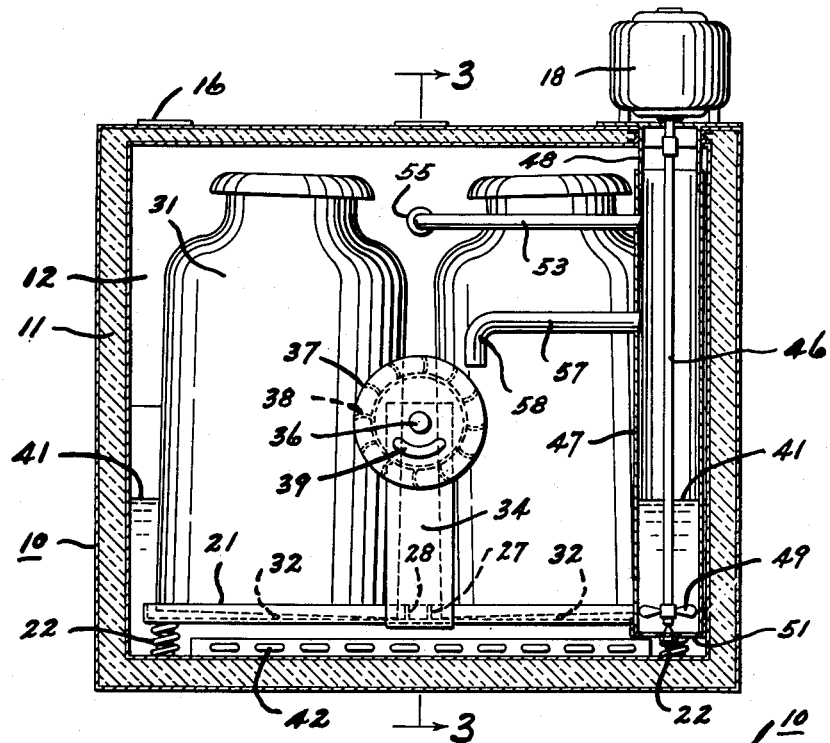
Fig. 2 is an enlarged vertical sectional view of the apparatus taken on the line 2—2 of Fig. 1.
Figure 5:
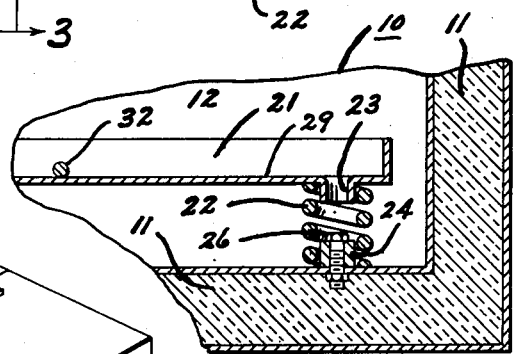
Figure 3:
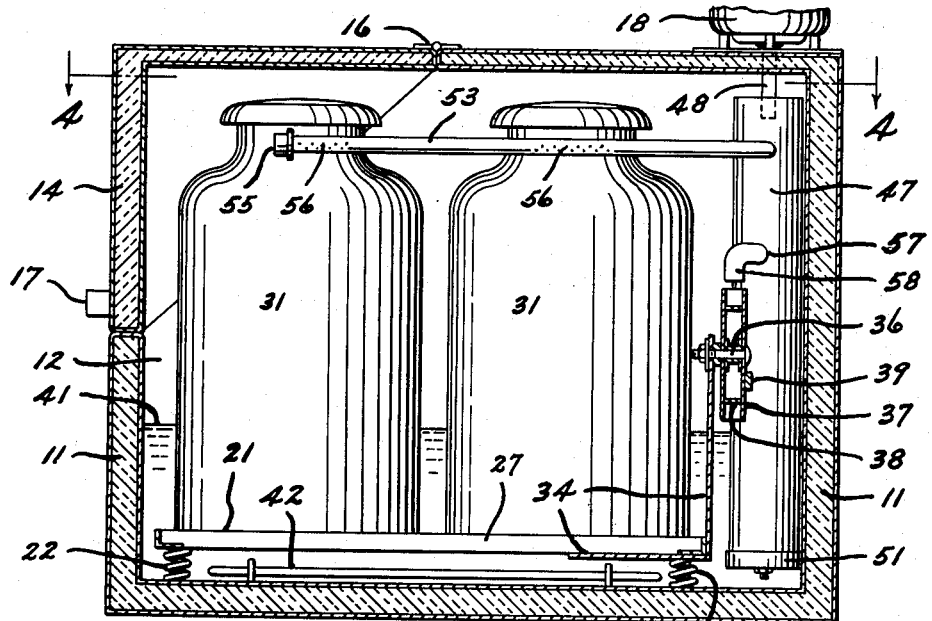
Figure 4:
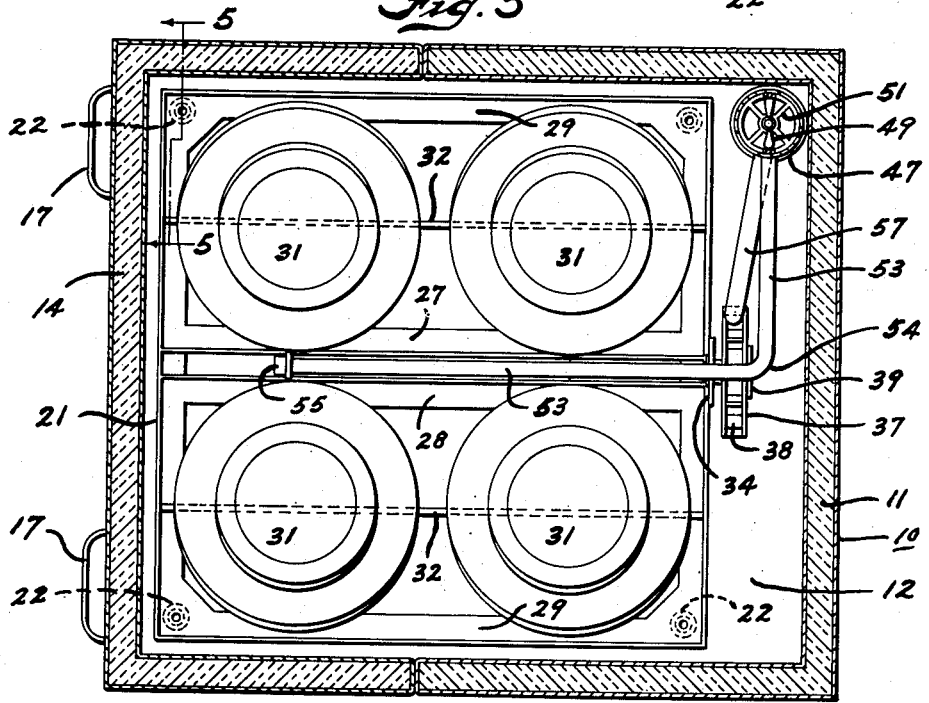

Fig. 3 is a vertical sectional view of the apparatus taken on the line 3—3 of Fig. 2;

Fig. 4 is a horizontal sectional view of the apparatus taken on the line 4—4 of Fig. 3; and Fig. 5 is an enlarged fragmentary sectional view taken on the line 5—5 of Fig. 4 showing one corner of a milk can supporting rack or platform resiliently mounted in the cabinet cooling compartment of the apparatus.

Figure 1:
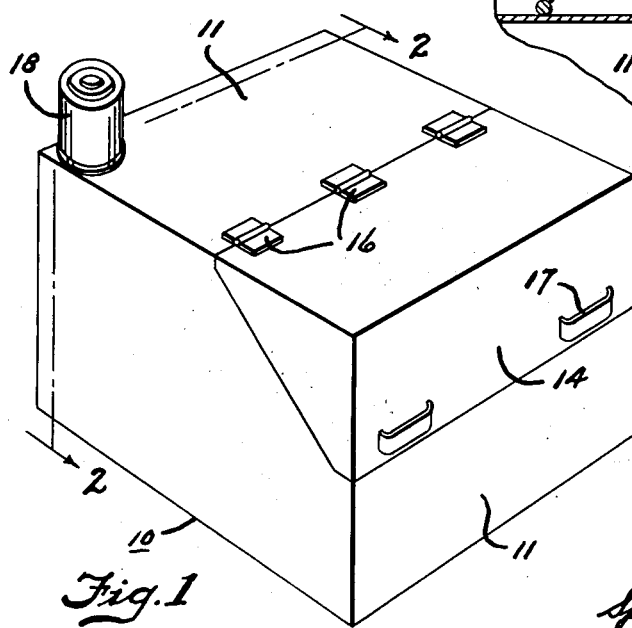
Fig. 1 is a perspective view of a milk cooling apparatus having my invention embodied therein.

Referring to the drawings, for illustrating my invention, I have shown in Fig. 1 thereof, a milk cooling apparatus including a cabinet 10 having a plurality of insulated walls 11 (see Fig. 2) forming a compartment 12 therein. Access to compartment 12 is provided through an opening normally closed by a door 14, hinged at 16 and provided with suitable handles 17 for moving the door about the hinges. The door 14 includes a horizontal wall portion, forming a part of the top wall of cabinet 10, a vertical wall portion, forming a part of the cabinet front wall and end wall portions forming a part of the cabinet side walls. An electric motor 18 is supported upon the top wall of cabinet 10 adjacent one of the rear corners thereof for a purpose to be hereinafter described.

A rack or platform generally represented by the numeral 21 is movably or resiliently mounted in spaced relation to the bottom wall of compartment 12 by a plurality of springs 22 each located near a corner of the rack 21. Rack 21 is rectangular in shape and is constructed of welded together angle iron members. In order to locate the rack in its proper position within compartment 12 a portion thereof adjacent its corners is deformed to provide a round depending flange 23 (see Fig. 5). The flange 23 fits into the open upper end of a supporting coil spring 22 and the open lower end of the spring 22 fits over a collar 24 secured to the metal liner of the bottom wall of compartment 12 by a stud or bolt 26. The point of attachment of stud or bolt 26 to the cabinet liner is sealed in any suitable or well-known manner against leakage of a liquid from the compartment. The four springs 22 resiliently support rack 21 in spaced relation to the bottom wall of compartment 12 and locates the same therein so that it may be vibrated or wobbled without striking upright walls of the compartment. Two centrally located angle iron portions 27 and 28 of rack or platform 21 (see Fig. 4) extend from the front to the back thereof and have their horizontally disposed flat parts cooperating with a flat portion 29 at the sides of rack 21 to provide track-like supports for large milk cans or receptacles 31. The weight of rack 21 and the filled cans 31 thereon compress the springs 22 which thereby resiliently support the load placed on the rack. The rack 21 also has small metal rods 32 secured thereto and extending from the front to the back thereof. The rods 32 are each located a short distance off-center of the tracks for the cans 31. That is, these rods 32 are mounted a little closer to the sides of the rack 21 than the distance from the center of the receptacle tracks to the angle iron portions 27 and 28 of the rack. In this off-center position of rods 32, together with their projecting above the flat can supporting portions 29 of the tracks, causes the cans or receptacles 31 to normally rest in a tilted position. That is, each can 31 in the rows thereof on rack 21 is tilted toward the center of compartment 12 as shown in Fig. 4 of the drawings for a purpose to be hereinafter described. The rods 32 beneath cans 31 in addition to tiltably supporting the cans on rack 21 also provide a means which permits the cans or receptacles to be moved or shifted to the rear of rack 21 with less effort than if the can bottoms rested on both flat rail portions of the can tracks.

It will be noted that the rear end of rack 21 is spaced a substantial distance from the back wall of compartment 12 and that a metal bracket 34 is secured to rack 21 and extends upwardly therefrom (see Figs. 2 and 3). This bracket 34 has a shaft 36 (see Fig. 3) suitably secured thereto and providing a mounting for a water wheel 37. Wheel 37 includes a suitable bearing for rotation on shaft 36. Wheel 37 is provided with a plurality of curved vanes 38 which, together with the two side walls of the wheel, form a plurality of pockets or buckets as is conventional in the construction of such wheels. Wheel 37 is also provided with an elongated metal plug or weight 39 which renders the wheel unbalanced for a purpose to be hereinafter described.

The lower portion of compartment 12 provides a sump containing a body of liquid 41, the level of which is far below the lowermost part of water wheel 37 when no cans 31 are in compartment 12, and which level approaches that shown in the drawings when four cans are placed in the compartment. A cooling element, such as an evaporator 42 connected in a conventional closed refrigerating system is disposed beneath the resiliently mounted rack 21. The evaporator 42 is immersed in the body of liquid 41 and operation of the refrigerating system to which it is connected, will cause refrigerant contained in the evaporator to vaporize or evaporate and remove heat from the liquid as is common practice in the art. Means is provided for circulating the liquid cooled by evaporator 42 upwardly in the body of liquid for spraying the cooled liquid into contact with the upper portion of the milk cans or receptacles 31 and for causing some of the elevated cooled circulating liquid to be discharged upon wheel 37. This means includes the electric motor 18 which has a shaft 46 connected thereto and depending into the body of liquid 41 within a tube or cylinder 47 supported from the top wall of cabinet 10 by any suitable brackets or the like 48 (see Figs. 2 and 3). The tube or cylinder 47 is located in the space at the rear of compartment 12 between rack 21 and back wall of the compartment. Shaft 46 has a pump secured to its lower end and this pump may be of any desired or conventional construction. In the present illustration this pump is shown as being of a fan-like type indicated at 49. The lower end of cylinder 47 is provided with a spider-like cap 51 having a bearing point for the lower end of shaft 46. The openings in cap 51 may, if desired, be covered with a screen or the like to prevent the entrance of dirt and scum into the cylinder 47. A pipe 53 has its one end connected to and communicating with the interior upper portion of the cylinder 47. This pipe 53 extends along the back wall of compartment 12 and is provided with a right angled bend 54 (see Fig. 4) so as to direct the pipe along and between the rows of cans 31. The other end of pipe 53 is closed by a plug or cap 55. A plurality of groups of small holes, indicated at 56 in the drawings, are provided in pipe 53 opposite the upper portion of the milk cans or receptacles 31 (see Fig. 3). Another pipe 57 is connected to and communicates with the interior of cylinder 47 at a point below the point of communication of pipe 53 therewith. This pipe 57 is bent downwardly as at 58 to locate its open end above the center and to one side of the water wheel 37, so that water discharged therefrom will flow against the vanes 38 and into the pockets or buckets of the wheel.

Having described the construction and arrangement of parts of the present apparatus, its use and operation will now be explained. The refrigerating system associated with the cabinet 10 is put into operation, for cooling the body of liquid 41 to the desired low temperature, prior to the time cans or receptacles containing milk or other substance are placed in compartment 12. When a can or a plurality of cans or receptacles 31 are placed in compartment 12, by way of the access opening normally closed by door 14, the first cans are slid rearwardly on rack 21 to the position indicated in the drawings. The next cans placed in compartment 12 rest on the front portion of rack 21 as shown in the drawings. These receptacles 31 rest on rack 21 in a position tilted toward the center of compartment 12 by virtue of being supported partly on rods 32 and partly on the flat track parts of the angle iron portions 27 and 28 of the track. The electric motor 18 is then energized to cause rotation of shaft 46 and operation of the pump 49. Pump 49 draws the cooled liquid into the cylinder 47 and circulates this liquid upwardly therein above the body thereof in compartment 12. The elevated cooled liquid flows from cylinder 47 into pipe 53 and is sprayed, through the holes 56, in a plurality of streams onto the upper portion of the cans 31 to chill or cool the milk mantained therein. This sprayed liquid falls back into the body of liquid in compartment 12 where it is recooled and recirculated. Simultaneously with this circulation of the cooled liquid some of the elevated or circulating liquid flows from cylinder 47 into pipe 57 and is directed, in the form of a large single stream thereof, upon the water wheel 37. The force of liquid being discharged from pipe 57 against the vanes 38 of wheel 37 together with the weight of liquid in the pockets or buckets of the wheel overcomes the weight 39 secured to the wheel and causes the wheel to rotate. The speed of rotation of wheel 37 is predetermined by the size of pipe 57 and the amount of liquid discharged therefrom so as to cause the weight 39 on the wheel to create an unbalanced condition of rotation of the water wheel which, through its mounting 34 on rack 21, causes the rack to vibrate or wobble on its mounting springs 22. The unbalanced condition of rotation of wheel 37 is caused by the fact that the weight 39 on the wheel changes the speed of revolutions thereof, For example, the wheel 37 slows down in speed as the weight 39 is being elevated to a point above the shaft 36 and then the wheel speed is increased after the weight 39 has been elevated and moved past the center of rotation of the wheel. The vibrating or wobbling action of rack 21 agitates milk or other substance in the cans or receptacles 31 and causes milk in the central portion of the cans to move or flow toward the side wall of the cans. Consequently milk contained in the cans is agitated and mixed during cooling thereof, by the spray of cold liquid into contact with the cans, to substantially reduce the time required to chill the body of milk in the cans to the desired temperature. The flow of streams of cooling liquid onto the upper portion of receptacles 31 causes the receptacles to tilt in a direction on rack 21 opposite to that shown in Fig. 4 of the drawings. However, the vibrating or wobbling movement of rack 21 on the compressed springs 22 occasionally or intermittently attain such intensity that the cans 31 are caused to overcome the force of the streams of cooling liquid being directed thereagainst and the cans therefore tilt about the rods 32 back to the position shown in Fig. 4. In this manner the cans or receptacles 31 are tilted back and forth in a direction perpendicular to the side walls of compartment 12. Tilting of the cans or receptacles as described moves the body of milk therein to agitate and mix the same to thereby augment agitation of the milk caused by the vibrating or wobbling movement of rack 21 on the springs 22. It is to be understood that the increased level of the body of liquid in compartment 12, when cans 31 are placed therein, has a tendency to add a certain amount of buoyant effect to the cans 31 which is an aid to the means disclosed for moving the milk cans. Thus I have provided an effective and efficient method of and apparatus for agitating a substance contained in receptacles while chilling the substance. While I have shown four cans containing milk in the apparatus disclosed it is to be understood that any lesser number of cans of milk may be understood that any lesser number of cans of milk may be placed in the apparatus and chilled as described, while agitating the milk. In fact an unbalanced load, such as two or three cans of milk supported on the rack 21 has been found to create greater vibration or wobbling of the milk cans. Also while I show the rack mounted on springs it is to be understood that it may be mounted on flexible rubber or the like members or on combination rubber-like and spring members.

In view of the foregoing it should be apparent that I have provided an improved method of and apparatus for quickly chilling a large amount of milk. In a cooler of the type disclosed wherein the circulating cooling liquid is utilized to drive a means for agitating the milk only a single electric motor is required in the apparatus to carry out the operations of circulating the cooling liquid and of agitating milk in the receptacles. By agitating the milk in the cans by two different motions while chilling same the time required to cool the milk is decreased to a minimum. This time reduction is very important in keeping down bacteria content of milk which affects its fundamental qualities of healthfulness, food value, cleanliness, keeping qualities, taste and odor.

While the form of embodiment of the invention as herein disclosed, constitutes a preferred form, it is to be understood that other forms might be adopted, as may come within the scope of the claims which follow.

What is claimed is as follows:

1. In combination, a cabinet having a plurality of walls forming a compartment therein, a body of liquid in the lower portion of said compartment, means for cooling the body of liquid, means for movably supporting a receptacle containing a substance to be chilled within said compartment, means for circulating cooled liquid upwardly from the body thereof, means for spraying cooled liquid into contact with said receptacle, a water wheel disposed above the level of the body of water in said compartment and being so constructed and arranged as to impart movement to said receptacle for agitating the substance therein while chilling same, and means for directing a stream of the circulating cooled liquid upon said water wheel to rotate same.

2. In combination, a cabinet having a plurality of walls forming a compartment therein, a body of liquid in the lower portion of said compartment, means for cooling the body of liquid, means for movably supporting a receptacle containing a substance to be chilled within said compartment, means for circulating cooled liquid upwardly from the body thereof, means for spraying cooled liquid into contact with said receptacle, an unbalanced water wheel disposed above the level of the body of water in said compartment and mounted on a part of said receptacle support for imparting motion thereto to vibrate said receptacle and agitate the substance therein while chilling same, and means for directing a stream of the circulating cooled liquid upon said wheel to rotate same.

3. The method of agitating a substance contained in a receptacle while chilling the same which consists in, submerging a portion of the receptacle in a body of liquid contained in a compartment, tiltably supporting the receptacle in the compartment on a resiliently mounted element, cooling the body of liquid, pumping cooled liquid upwardly above the level of the body thereof in the compartment, dividing the upwardly pumped liquid into separate spaced apart streams and returning the streams to the body of liquid in the compartment, utilizing one of the returning streams of liquid to cause a vibrating movement of the resiliently mounted element and the receptacle thereon, and directing the other of the returning streams of liquid onto that portion of the receptacle above the level of the body of liquid in the compartment to at times tilt the receptacle back and forth on its supporting element during vibration thereof.

4. In combination, a cabinet having a plurality of walls forming a compartment therein, a body of liquid in said compartment, means for cooling the body of liquid, means for movably supporting a receptacle adapted to contain a substance to be chilled in said compartment, means for pumping cooling liquid upwardly from the body thereof in the compartment, means for dividing the upwardly pumped liquid into separate spaced apart streams and for returning the streams to the body, means for spraying the liquid of one of said returning streams onto a portion of said receptacle located above the body of liquid in the compartment, and means rendered effective by the flow of liquid in the other of said returning streams for moving said receptacle whereby a substance contained therein will be agitated while being chilled.

5. In combination, a cabinet having a plurality of walls forming a compartment therein, a body of liquid in said compartment, means for cooling the body of liquid, means for movably supporting a receptacle adapted to contain a substance to be chilled in said compartment, means for pumping cooling liquid upwardly from the body thereof in the compartment, means for dividing the upwardly pumped liquid into separate spaced apart streams and for returning the streams to the body, means for spraying the liquid of one of said returning streams onto a portion of said receptacle located above the body of liquid in the compartment, rotatable means located above the level of the body of liquid in said compartment and having a connection with said receptacle support, and said rotatable means being operable in response to the flow of liquid in the other of said returning streams for moving said receptacle whereby a substance contained therein will be agitated while being chilled.

6. In combination, a cabinet having a plurality of walls forming a compartment therein, a body of liquid in said compartment, means for cooling the body of liquid, means for resiliently supporting a receptacle adapted to contain a substance to be chilled in said compartment, means for pumping cooling liquid upwardly from the body thereof in the compartment, means for dividing the upwardly pumped liquid into separate spaced apart streams and for returning the streams to the body, means for spraying the liquid of one of said returning streams onto a portion of said receptacle located above the body of liquid in the compartment, a water wheel mounted on a part of said receptacle support and located above the level of the body of liquid in said compartment, said water wheel being rotatable in response to the flow of liquid in the other of said returning streams, and said water wheel being unbalanced so that its rotation causes vibration of the receptacle support and said receptacle thereon whereby a substance contained therein will be agitated while being cooled.

7. The method of agitating a substance contained in a receptacle while chilling the same which consists in, cooling a body of liquid contained in a compartment, submerging a portion of the receptacle in the body of liquid in the compartment, supporting the receptacle in the compartment on a movably mounted element, pumping cooled liquid upwardly above the level of the body thereof in the compartment, dividing the upwardly pumped liquid into separate spaced apart streams and returning the streams to the body of liquid in the compartment, directing one of the returning streams of liquid onto that portion of the receptacle above the level of the body of liquid in the compartment, and utilizing the other of the returning streams of liquid to move the movably mounted element and the receptacle thereon.

8. In combination, a cabinet having a plurality of walls forming a compartment therein, a body of liquid in said compartment, means for cooling said body of liquid, a support resiliently mounted within said compartment for receiving a receptacle adapted to contain a substance to be chilled, a member secured to said support and extending under a receptacle when located thereon for tiltably mounting the receptacle upon said support, means for circulating cooled liquid upwardly above the level of the body thereof in said compartment, means for dividing the upwardly circulated liquid into separate spaced apart streams and for returning the streams to the body of liquid in said compartment, means for spraying the liquid of one of said returning streams onto a portion of the receptacle disposed above the body of liquid in said compartment, means rendered effective in response to the flow of liquid in the other of said returning streams for moving said receptacle support and vibrating the receptacle thereon whereby a substance contained in the receptacle will be agitated while being chilled, and the force of said spray upon the receptacle being sufficient to tilt at times the receptacle upon said member and relative to said support during vibrations thereof.

9. In combination, a cabinet having a plurality of walls forming a compartment therein, a body of liquid in said compartment, means for cooling said body of liquid, a support resiliently mounted within said compartment for receiving a receptacle adapted to contain a substance to be chilled, a member secured to said support and extending under a receptacle when located thereon for tiltably mounting the receptacle upon said support, means for circulating cooled liquid upwardly above the level of the body thereof in said compartment, means for dividing the upwardly circulated liquid into separate spaced apart streams and for returning the streams to the body of liquid in said compartment, a water wheel mounted on a part of said receptacle support and located above the level of the body of liquid in said compartment, said water wheel being rotatable in response to the flow of liquid in one of said returning streams, said water wheel being unbalanced so that its rotation causes vibration of said receptacle support and the receptacle thereon whereby a substance contained therein will be agitated while being cooled, means for spraying the liquid of the other of said returning streams onto a portion of the receptacle disposed above the body of liquid in said compartment, and the force of said spray upon the receptacle being sufficient to tilt at times the receptacle upon said member and relative to said support during vibrations thereof.

DANIEL L. KAUFMAN.

REFERENCES CITED

The following references are of record in the file of this patent:

UNITED STATES PATENTS

| Number | Name | Date |
|---|---|---|
| 778,842 | Bouchard | Jan. 5, 1905 |
| 2,094,774 | Dawson | Oct. 5, 1937 |
| 2,249,660 | Lee | July 15, 1941 |
| 2,288,137 | Jones | June 30, 1942 |
| 2,455,162 | Donnelly | Nov. 30, 1948 |